United States Patent
Suzuki et al.

(10) Patent No.: US 9,726,224 B2
(45) Date of Patent: Aug. 8, 2017

(54) TAPERED ROLLER BEARING

(71) Applicant: JTEKT CORPORATION, Osaka-shi, Osaka (JP)

(72) Inventors: Akiyuki Suzuki, Nagoya (JP); Atsushi Nagai, Kashiwara (JP)

(73) Assignee: JTEKT CORPORATION, Osaka-shi (JP)

( * ) Notice: Subject to any disclaimer, the term of this patent is extended or adjusted under 35 U.S.C. 154(b) by 0 days.

(21) Appl. No.: 14/620,881

(22) Filed: Feb. 12, 2015

(65) Prior Publication Data
US 2015/0247532 A1 Sep. 3, 2015

(30) Foreign Application Priority Data

Mar. 3, 2014 (JP) ................. 2014-040356

(51) Int. Cl.
*F16C 33/66* (2006.01)
*F16C 19/54* (2006.01)
*F16C 19/36* (2006.01)
*F16C 43/04* (2006.01)
*F16C 33/58* (2006.01)
*F16C 33/60* (2006.01)

(52) U.S. Cl.
CPC ........ *F16C 33/6651* (2013.01); *F16C 19/364* (2013.01); *F16C 33/6674* (2013.01); *F16C 19/548* (2013.01); *F16C 33/586* (2013.01); *F16C 33/60* (2013.01); *F16C 43/04* (2013.01); *F16C 2361/61* (2013.01)

(58) Field of Classification Search
CPC .... F16C 33/586; F16C 33/60; F16C 33/6651; F16C 33/6674; F16C 33/7886; F16C 33/783; F16C 19/364; F16C 19/548; F16C 43/04; F16C 2361/61
See application file for complete search history.

(56) References Cited

U.S. PATENT DOCUMENTS

| | | | | |
|---|---|---|---|---|
| 3,519,316 A | * | 7/1970 | Gothberg | F16C 33/768 277/367 |
| 3,594,050 A | * | 7/1971 | Gothberg | F16C 33/7886 384/484 |
| 3,656,825 A | * | 4/1972 | Manger | F16C 19/26 384/561 |

(Continued)

FOREIGN PATENT DOCUMENTS

| | | |
|---|---|---|
| JP | 2008-057791 A | 3/2008 |
| JP | 2008-232255 A | 10/2008 |

*Primary Examiner* — Alan B Waits
(74) *Attorney, Agent, or Firm* — Oliff PLC (57) ABSTRACT

A front bearing (tapered roller bearing) includes an inner ring, an outer ring, a plurality of tapered rollers, a cage, and a lubricating oil holding member. The lubricating oil holding member includes: a cylindrical portion having an axial length from a large diameter-side outer ring end surface to an end portion of the cage and capable of resisting a pressing force for press-fitting the outer ring; a fitting hook that is connected to one end of the cylindrical portion, that projects in the axial direction from an abutment surface which is in surface contact with the large diameter-side outer ring end surface, and that is fitted in an engagement groove portion provided in an outer peripheral surface of the outer ring; and a projection that projects radially inward from an inner peripheral surface of the cylindrical portion.

20 Claims, 7 Drawing Sheets

(56) References Cited

U.S. PATENT DOCUMENTS

| | | | | |
|---|---|---|---|---|
| 3,733,109 A * | 5/1973 | Hallerback | ............ | F16C 33/605 384/564 |
| 3,814,446 A * | 6/1974 | Derman | .............. | F16C 33/7886 277/366 |
| 4,235,485 A * | 11/1980 | Reiter | ..................... | B21B 31/07 384/450 |
| 4,336,971 A * | 6/1982 | Reiter | ..................... | B21B 31/07 384/484 |
| 4,408,809 A * | 10/1983 | Walter | ................ | B60B 27/0005 384/486 |
| 4,692,040 A * | 9/1987 | Ebaugh | ................... | B21B 31/07 277/551 |
| 4,699,529 A * | 10/1987 | Scholl | ..................... | F16C 19/26 384/484 |
| 4,872,770 A * | 10/1989 | Dickinson | ............. | F16C 23/086 277/562 |
| 4,919,551 A * | 4/1990 | Nunotani | .............. | F16C 19/364 277/361 |
| 5,873,658 A * | 2/1999 | Message | ............. | F16C 33/7886 324/207.25 |
| 6,241,396 B1 * | 6/2001 | Shimomura | .......... | B21B 31/078 277/551 |
| 7,374,345 B2 * | 5/2008 | Ilie | ...................... | F16C 33/7886 384/537 |
| 7,645,074 B2 * | 1/2010 | Chiba | ................... | F16C 19/364 384/571 |
| 7,950,856 B2 * | 5/2011 | Sada | ..................... | F16C 19/364 384/473 |
| 8,348,512 B2 * | 1/2013 | Dittmer | ................... | F16D 23/14 29/898.11 |
| 8,702,313 B2 * | 4/2014 | Liang | ..................... | F16C 19/388 277/345 |
| 9,051,964 B2 * | 6/2015 | Yamashita | ............ | B60B 27/001 |
| 9,222,508 B2 * | 12/2015 | Brown | ................. | F16C 19/364 |
| 2006/0245678 A1 * | 11/2006 | Chiba | ................... | F16C 19/364 384/571 |
| 2007/0133914 A1 * | 6/2007 | Matsuyama | .......... | F16C 19/163 384/470 |
| 2008/0096715 A1 * | 4/2008 | Ono | ...................... | F16C 19/548 475/160 |
| 2008/0219606 A1 | 9/2008 | Sada et al. | | |
| 2009/0208152 A1 * | 8/2009 | Masuda | ................ | F16C 19/364 384/100 |
| 2010/0316318 A1 * | 12/2010 | Hewitt | ................. | F16C 33/7806 384/477 |
| 2015/0071581 A1 * | 3/2015 | Gieser | ................. | F16C 33/7886 384/559 |

* cited by examiner

TAPERED ROLLER BEARING

INCORPORATION BY REFERENCE

The disclosure of Japanese Patent Application No. 2014-040356 filed on Mar. 3, 2014 including the specification, drawings and abstract, is incorporated herein by reference in its entirety.

BACKGROUND OF THE INVENTION

1. Field of the Invention

The present invention relates to a tapered roller bearing.

2. Description of the Related Art

Hitherto, there has been known a tapered roller bearing having an inner ring, an outer ring, a plurality of tapered rollers, and a cage. The inner ring has an outer peripheral surface formed as an inner ring raceway surface in the shape of a conical surface. The outer ring has an inner peripheral surface formed as an outer ring raceway surface in the shape of a conical surface, and disposed concentrically on the outer circumferential side of the inner ring. The tapered rollers are rollably disposed in an annular space between the inner ring raceway surface and the outer ring raceway surface. The cage has a plurality of pockets in which the tapered rollers are held. The tapered roller bearing is used to support a shaft mounted inside a gear mechanism such as a transmission and a differential device in an automobile.

Lubricating oil is distributed in such a tapered roller bearing by an oil drawing phenomenon called a pumping action of the tapered roller bearing. That is, lubricating oil is distributed by flowing into the tapered roller bearing from a cone front face rib (hereinafter referred to as a small rib) side, which is on a small diameter end portion side of the inner ring raceway surface of the tapered roller bearing, and being discharged from the a cone back face rib (hereinafter referred to as a large rib) side, which is on a large diameter end portion side of the inner ring raceway surface, because of a centrifugal force generated as the tapered rollers rotate and revolve. The pumping action is increased in proportion to the rotational speed of the bearing. Therefore, in the case where the rotational speed of the bearing in a transmission is high, the pumping action may be so strong that lubricating oil may not be delivered sufficiently to components such as bearings. In a differential device, lubricating oil stored in an oil reservoir is splashed and scattered by rotation of a differential ring gear, which is a component of the differential device, to lubricate the tapered roller bearing. In an initial period of rotation such as during startup of an engine, however, the splashing action of the differential ring gear may not be sufficient, which may cause poor lubrication. Because the conical surfaces of the tapered rollers in the tapered roller bearing contact the inner ring raceway surface through rolling contact, the temperature of the conical surfaces is not easily raised by sliding friction, and the conical surfaces are not easily seized. On the other hand, contact between the large end faces of the tapered rollers and the large rib that projects radially outward at the large diameter end portion side of the inner ring raceway surface is sliding contact. Therefore, in the case where the portion with such sliding contact is used under poor lubrication, the portion may be seized by a temperature rise due to sliding friction.

There is known a technology in which an annular guiding member that guides lubricating oil flowing toward an inner peripheral surface (outer ring raceway surface) of an outer ring, toward an outer peripheral surface of a large rib of an inner ring via a pocket of a cage, is mounted so as to be openable and closable via an elastic element at an end portion of the outer ring corresponding to a large rib side of the inner ring (an outer ring end surface of the outer ring on the large diameter side of the outer ring raceway surface) (Japanese Patent Application Publication No. 2008-232255 (JP 2008-232255 A)).

There is also known a bearing in which an end portion of an outer ring corresponding to a large rib side of an inner ring (an outer ring end surface of the outer ring on the large diameter side of an outer ring raceway surface), of the end surfaces of the outer ring, is formed to be thin and long, and an annular member with an L-shaped section is fitted into the inner peripheral surface of the end portion to provide a reservoir portion for lubricating oil (Japanese Patent Application Publication No. 2008-57791 (JP 2008-57791 A)).

With the technology according to JP 2008-232255 A, however, it is difficult to reduce the component cost since a plurality of components such as the annular guiding member and the elastic element are involved. For assembly of the tapered roller bearing, in addition, a three-in-one temporary assembly of the inner ring, the cage, and the tapered rollers may be fitted into the outer ring raceway of the outer ring with the outer ring press-fitted into a housing in advance. Therefore, the annular guiding member and the elastic element may present an issue in mounting workability in the case where the annular guiding member and the elastic element are mounted with the tapered roller bearing attached to the housing.

With the tapered roller bearing according to JP 2008-57791 A, the processability may be reduced by deformation or the like due to heat treatment because the end portion of the outer ring is formed to be thin. In addition, the annular member fitted into the end portion of the outer ring is pressed in the axial direction together with the outer ring when the outer ring is press-fitted into the housing, and therefore may be crushed by such a pressing force.

SUMMARY OF THE INVENTION

An object of the present invention is to provide a tapered roller bearing having such a lubricating oil holding configuration in an outer ring end surface of an outer ring on the large diameter side of an outer ring raceway surface that allows reducing the number of components, improving the mounting workability, and suppressing a reduction in processability of the outer ring.

An aspect of the present invention provides a tapered roller bearing including: an inner ring that has an outer peripheral surface formed as an inner ring raceway surface in a shape of a conical surface; an outer ring that is disposed concentrically on an outer circumferential side of the inner ring and has an inner peripheral surface formed as an outer ring raceway surface in a shape of a conical surface; a plurality of tapered rollers rollably disposed in an annular space between the inner ring raceway surface and the outer ring raceway surface; a cage that has a plurality of pockets in which the tapered rollers are held; and a lubricating oil holding member that is disposed adjacent to an outer ring end surface of the outer ring on a large diameter side of the outer ring raceway surface and holds a lubricating oil held in the tapered roller bearing. In the tapered roller bearing, the lubricating oil holding member includes: a cylindrical portion having an axial length from the outer ring end surface of the outer ring on the large diameter side to an end of the cage and capable of resisting a pressing force for press-fitting the outer ring; a fitting hook that is connected to one end of the cylindrical portion, that projects in an axial direction from an abutment surface which is in surface contact with the outer ring end surface of the outer ring on the large diameter side, and that is fitted in an engagement groove portion provided in an outer peripheral surface of the outer ring; and a projection that projects radially inward from an inner peripheral surface of the cylindrical portion.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

A tapered roller bearing according to an embodiment of the present invention will be described below with reference to FIGS. 1 to 7. The tapered roller bearing according to the embodiment is applied to a rear differential device, among differential devices applied to an automobile with four-wheel drive, for example.

Figure 1:
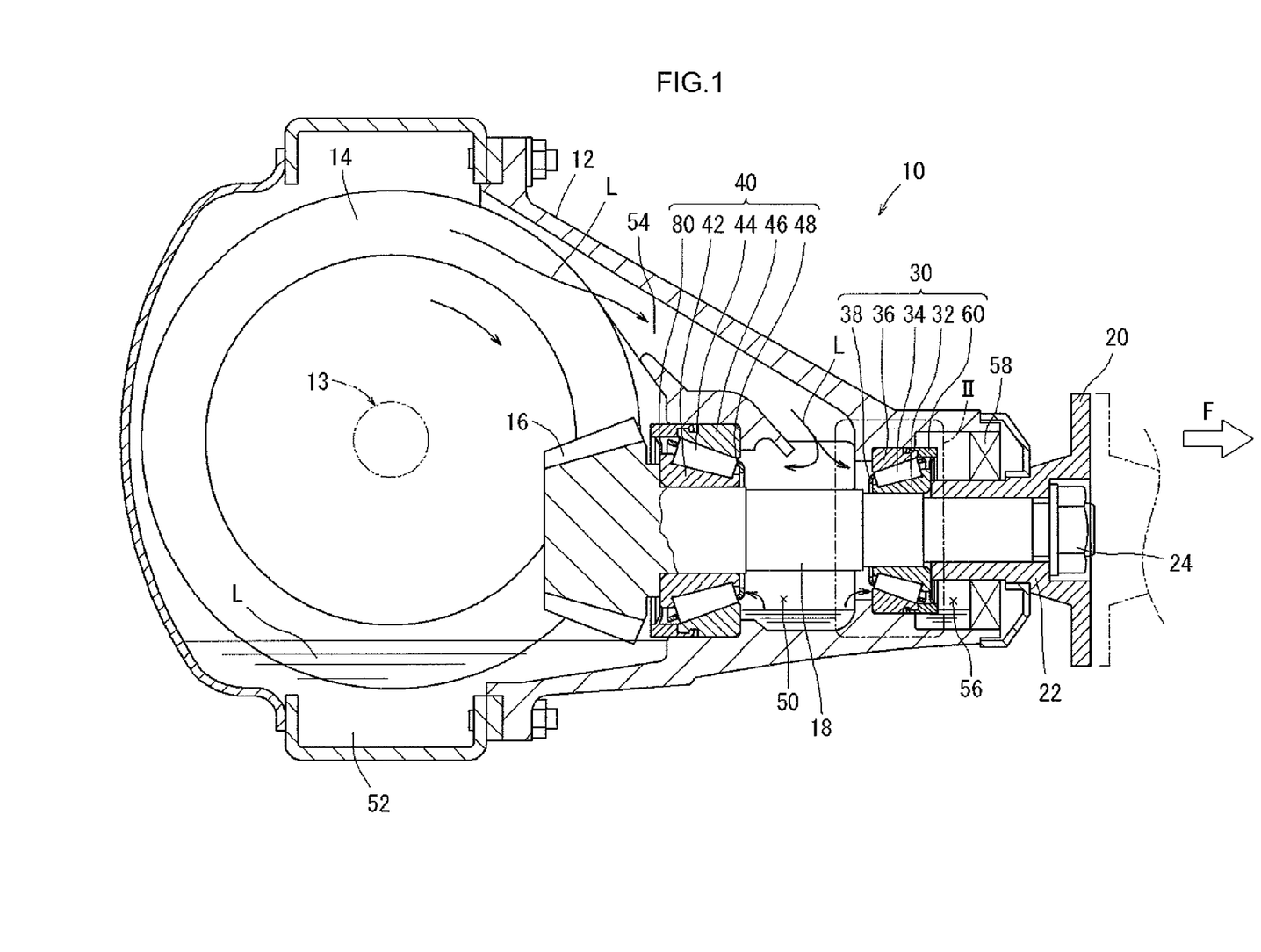
FIG. 1 is a sectional view schematically illustrating a tapered roller bearing mounted to a differential device according to an embodiment taken along the axial direction.

FIG. 1 is a sectional view schematically illustrating the overall configuration of the differential device according to the embodiment taken along the axial direction. In FIG. 1, a differential ring gear 14 is provided with a differential mechanism (not illustrated). In FIG. 1, the direction of the arrow F indicates the travel direction of the automobile traveling forward.

In a differential device 10 according to the embodiment, as illustrated in FIG. 1, the differential ring gear 14 and a drive pinion 16 are disposed in a differential carrier 12 so as to be meshed with each other. The drive pinion 16 is formed integrally with the left end of a drive pinion shaft 18 as seen in FIG. 1. A sleeve 22 of a companion flange 20 is rotatably coupled to the right end of the drive pinion shaft 18 as seen in FIG. 1 by a nut 24. The companion flange 20 is drivably coupled to a front engine via a joint or a propeller shaft (not illustrated) so that a drive force of the front engine is transferred to the companion flange 20. A differential mechanism (not illustrated) is mounted to the differential ring gear 14 so that motive power is transmitted from the differential mechanism to right and left wheels.

As illustrated in FIG. 1, the drive pinion shaft 18 is supported on the differential carrier 12 through a front bearing 30 and a rear bearing 40. The front bearing 30 and the rear bearing 40 are each a tapered roller bearing. The front bearing 30 and the rear bearing 40 have substantially the same configuration, and therefore are described using the front bearing 30 as an example.

As illustrated in FIGS. 1 to 4, the front bearing 30 (tapered roller bearing) is roughly composed of an inner ring 32, tapered rollers 34, an outer ring 36, a cage 38, and a lubricating oil holding member 60. The inner ring 32 has an outer peripheral surface formed as an inner ring raceway surface 32a in the shape of a conical surface. A small rib 32b in the shape of a rib that projects radially outward is formed on a small diameter end portion side of the inner ring raceway surface 32a. A large rib 32c in the shape of a rib that projects radially outward is formed on a large diameter end portion side of the inner ring raceway surface 32a.

The outer ring 36 is disposed concentrically on the outer circumferential side of the inner ring raceway surface 32a of the inner ring 32 to face the inner ring 32, and has an inner peripheral surface formed as an outer ring raceway surface 36a in the shape of a conical surface. A plurality of tapered rollers 34 are rollably disposed in an annular space between the inner ring raceway surface 32a of the inner ring 32 and the outer ring raceway surface 36a of the outer ring 36.

The tapered rollers 34 are each formed with a conical surface 34a so as to be rollable as held between the inner ring raceway surface 32a and the outer ring raceway surface 36a. A roller small end face 34b and a roller large end face 34c are formed on a small diameter end portion side and a large diameter end portion side, respectively, of the conical surface 34a. The tapered rollers 34 are arranged between the inner ring 32 and the outer ring 36 as held in pockets 39 of the cage 38, and can rotate and revolve on the outer peripheral surface of the drive pinion shaft 18. The cage 38 holds the tapered rollers 34 such that the conical surfaces 34a of the tapered rollers 34 can rotate and revolve between the inner ring raceway surface 32a of the inner ring 32 and the outer ring raceway surface 36a of the outer ring 36.

An outer peripheral surface 36d of the outer ring 36 is provided with engagement groove portions 36e to be fitted with fitting hooks 66 of the lubricating oil holding member 60 to be discussed later. The engagement groove portions 36e are provided in the outer peripheral surface 36d of the outer ring 36, and disposed with a space therebetween at circumferential positions corresponding to the fitting hooks 66 in the circumferential direction. The engagement groove portions 36e are each formed to have a notch portion 36f formed by cutting the outer peripheral surface 36d of the outer ring 36 into a flat shape. The notch portion 36f has two notch surfaces 36f1 and 36f2 with different depths to form a stepped surface 36g. Particularly, the notch surface 36f1 is placed adjacent to an outer ring end surface 36c of the outer ring 36 on the large diameter side of the outer ring raceway surface 36a, and formed by cutting the outer peripheral surface 36d into a flat shape. The notch surface 36f2 is placed adjacent to the notch surface 36f1 in the axial direction, and formed by cutting the outer peripheral surface 36d deeper than the notch surface 36f1 into a flat shape. The stepped surface 36g is formed by the notch surfaces 36f1 and 36f2 of the notch portion 36f having different depths. Such stepped surfaces 36g can be engaged with the fitting hooks 66 of the lubricating oil holding member 60 to be discussed later.

Figure 2:
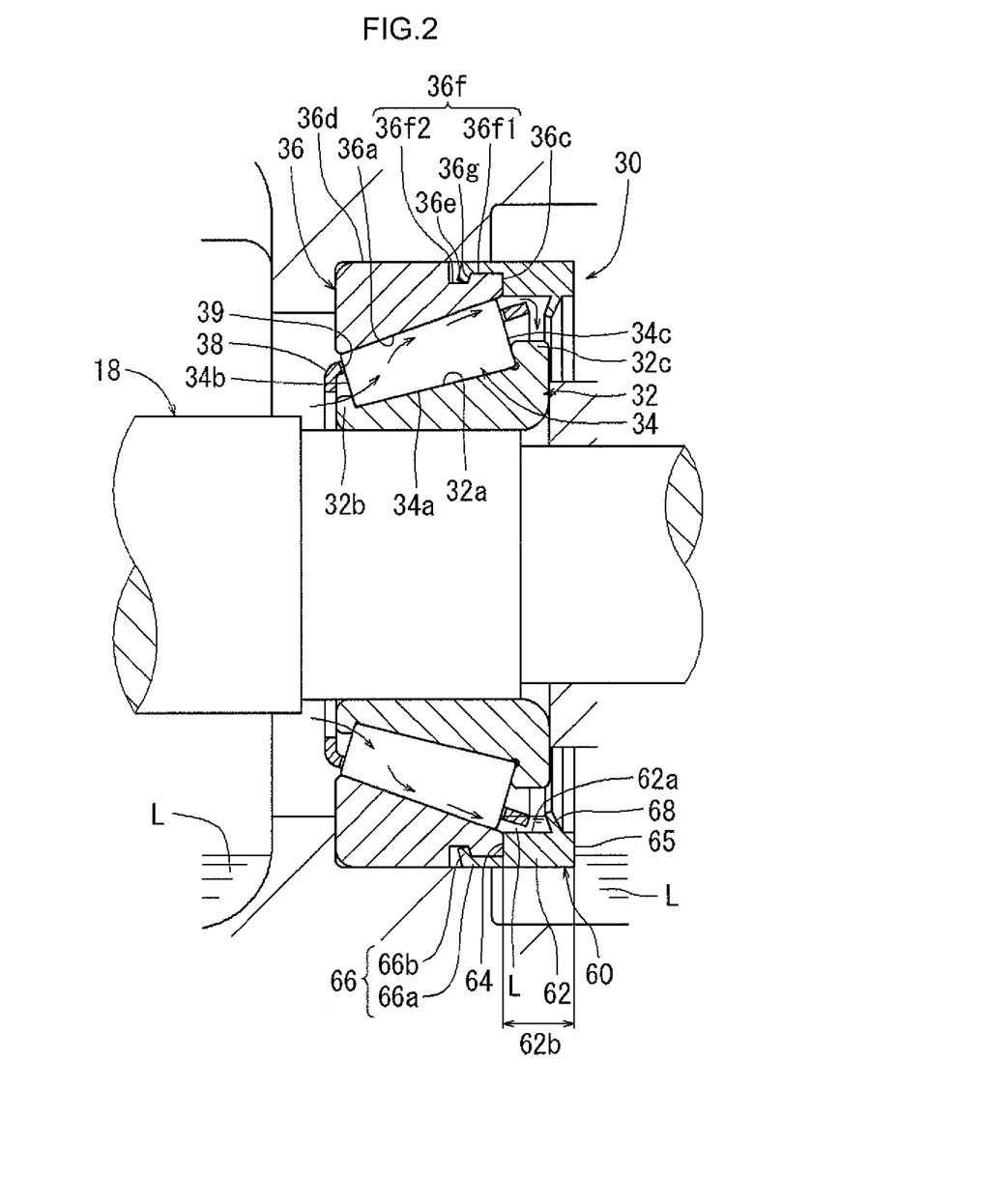
FIG. 2 is an enlarged sectional view illustrating the portion II of FIG. 1 as enlarged.
Figure 3:
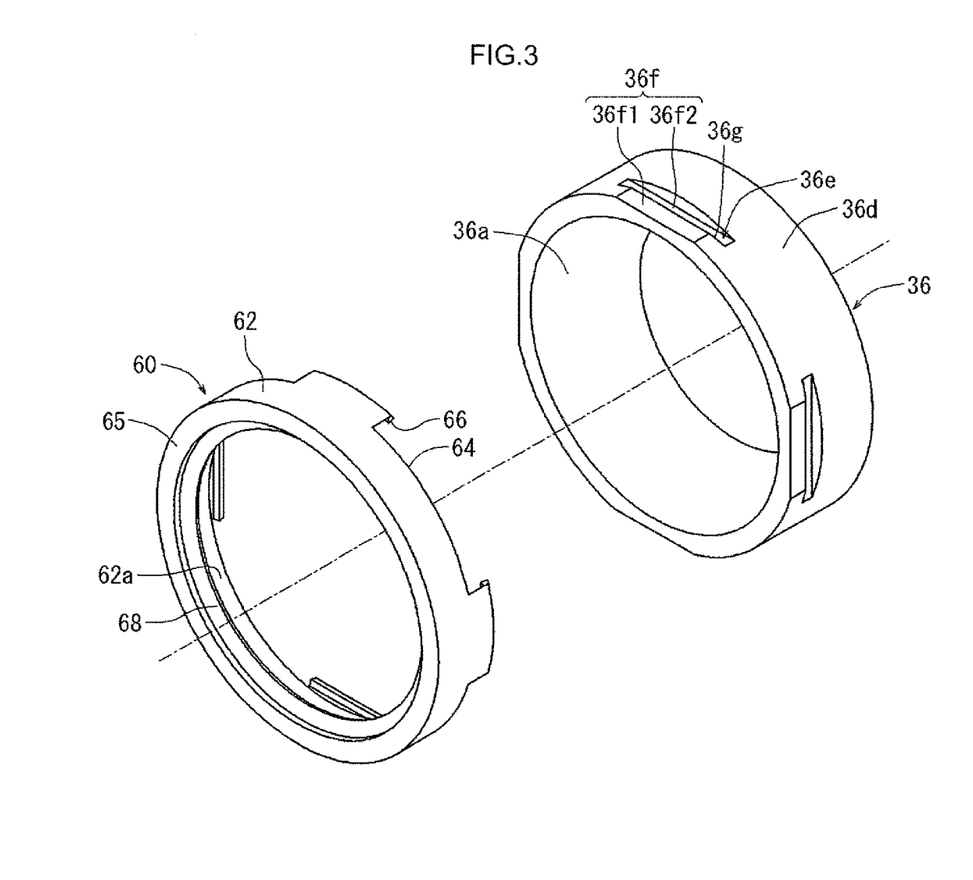
FIG. 3 is an exploded perspective view illustrating an overview of assembly of an outer ring and a lubricating oil holding member in the tapered roller bearing according to the embodiment.
Figure 4:
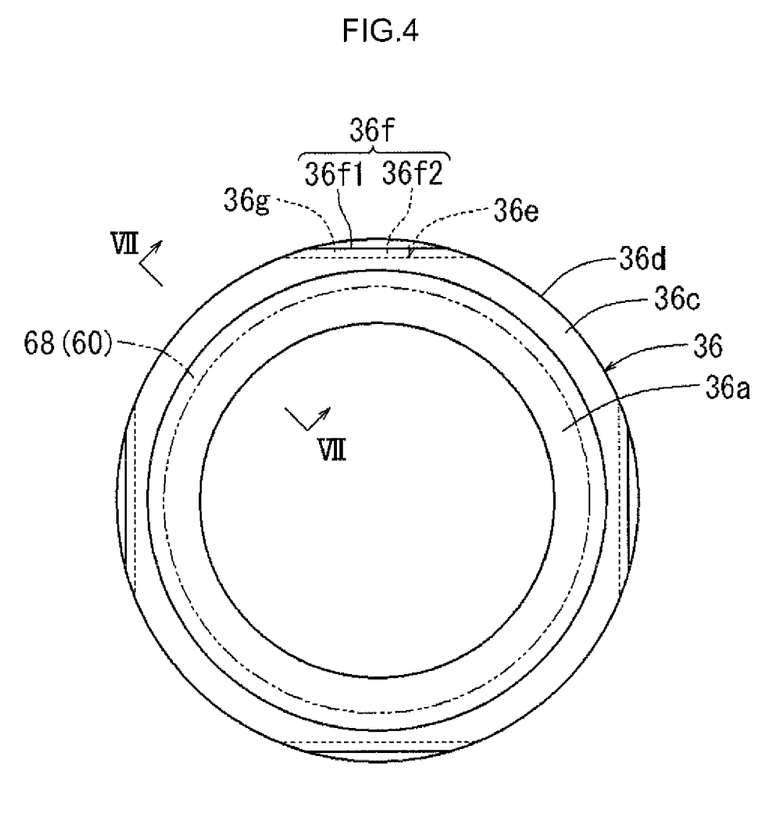
FIG. 4 is a side view of the outer ring and the lubricating oil holding member as seen from a large diameter-side outer ring end surface.

The lubricating oil holding member 60 is a member that provides a reservoir portion for lubricating oil L by holding the lubricating oil L distributed in the front bearing 30. The lubricating oil holding member 60 is also a member that guides the lubricating oil L toward the outer peripheral surface of the large rib 32c of the inner ring 32. As illustrated in FIG. 2, the lubricating oil holding member 60 is disposed adjacent to the large diameter-side outer ring end surface 36c of the outer ring raceway surface 36a of the outer ring 36 (an outer ring end surface of the outer ring on the large diameter side of the outer ring raceway surface). In other words, the large diameter-side outer ring end surface 36c is an end surface of the outer ring 36 corresponding to a large rib 32c side of the inner ring 32.

The lubricating oil holding member 60 is made of a synthetic resin with good oil resistance and heat resistance (such as a polyamide resin and a polyphenylene sulfide resin). In the lubricating oil holding member 60, a cylindrical portion 62, an abutment surface 64, a pressing surface 65, fitting hooks 66, and a projection 68 are provided integrally. The cylindrical portion 62 is formed to have generally the same diameter as that of the outer peripheral surface 36d of the outer ring 36. The cylindrical portion 62 is formed to have generally the same thickness as that of the large diameter-side outer ring end surface 36c. In addition, the cylindrical portion 62 has an axial length 62b from the large diameter-side outer ring end surface 36c of the outer ring 36 to an end portion of the cage 38 with the front bearing 30 assembled. Moreover, the cylindrical portion 62 is configured to resist a pressing force for press-fitting the outer ring 36 into the differential carrier 12 (housing).

The abutment surface 64 is one end of the cylindrical portion 62 and is in surface contact with the large diameter-side outer ring end surface 36c of the outer ring 36. The other end of the cylindrical portion 62 is provided with the pressing surface 65 to be pressed when the lubricating oil holding member 60 fitted with the outer ring 36 is press-fitted into the differential carrier 12.

Figure 7:
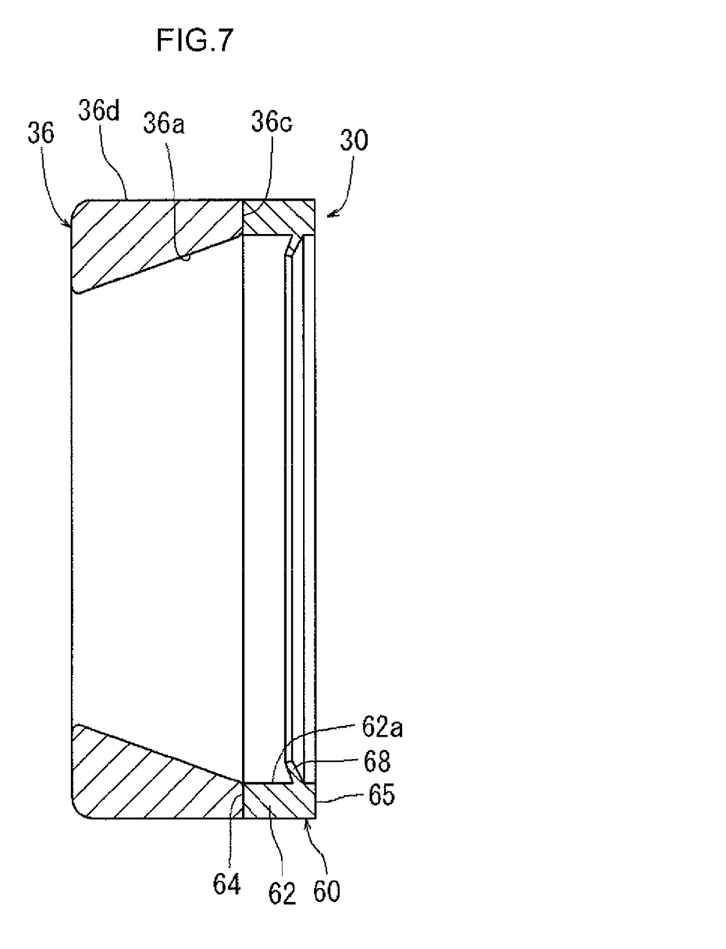
FIG. 7 is a sectional view taken along the line VII-VII of FIG. 4.

The fitting hooks 66 are connected to the one end of the cylindrical portion 62, and extend from the abutment surface 64 to be fitted in the engagement groove portions 36e provided in the outer peripheral surface 36d of the outer ring 36. The fitting hooks 66 each have a coupling portion 66a (protrusion) and a hook portion 66b. The coupling portion 66a extends in the axial direction from the abutment surface 64 of the cylindrical portion 62. The hook portion 66b projects radially inward from the inner peripheral surface at the distal end of the coupling portion 66a. Four fitting hooks 66 are provided at the one end of the cylindrical portion 62, and disposed with a space therebetween in the circumferential direction. A plurality of fitting hooks 66 are provided in view of the fact that the lubricating oil holding member 60 is coaxially disposed adjacent to the outer ring 36 in the axial direction. Therefore, three or more fitting hooks 66 are preferably provided in the circumferential direction in order to coaxially dispose the lubricating oil holding member 60 adjacent to the outer ring 36 in the axial direction. Further, in the case where three or more fitting hooks 66 are provided, the fitting hooks 66 are preferably provided at equal intervals in the circumferential direction. As illustrated in FIG. 7, in addition, portions of the one end of the cylindrical portion 62 in the circumferential direction at which the fitting hooks 66 are not provided serve as the abutment surface 64 which has generally the same thickness as that of the large diameter-side outer ring end surface 36c. Therefore, the area over which the abutment surface 64 contacts the large diameter-side outer ring end surface 36c can be increased so that the cylindrical portion 62 can endure the pressing force from the pressing surface 65.

The projection 68 is an annular portion that projects radially inward from an inner peripheral surface 62a of the cylindrical portion 62 and that is continuous in the circumferential direction. The projection 68 is formed to be thin with respect to the thickness of the cylindrical portion 62 to be elastically deformable. The projection 68 preferably projects from the inner peripheral surface 62a of the cylindrical portion 62 aslope toward the abutment surface 64 (opposite to the pressing surface 65) as seen in section taken along the axial direction. The projecting length of the projection 68 is set such that the projection 68 overlaps a part of the roller large end faces 34c of the tapered rollers 34 in the radial direction with the front bearing 30 and the lubricating oil holding member 60 placed adjacent in the axial direction. Consequently, the projection 68 can provide a reservoir portion for the lubricating oil L by holding the lubricating oil L distributed in the front bearing 30.

Figure 6:
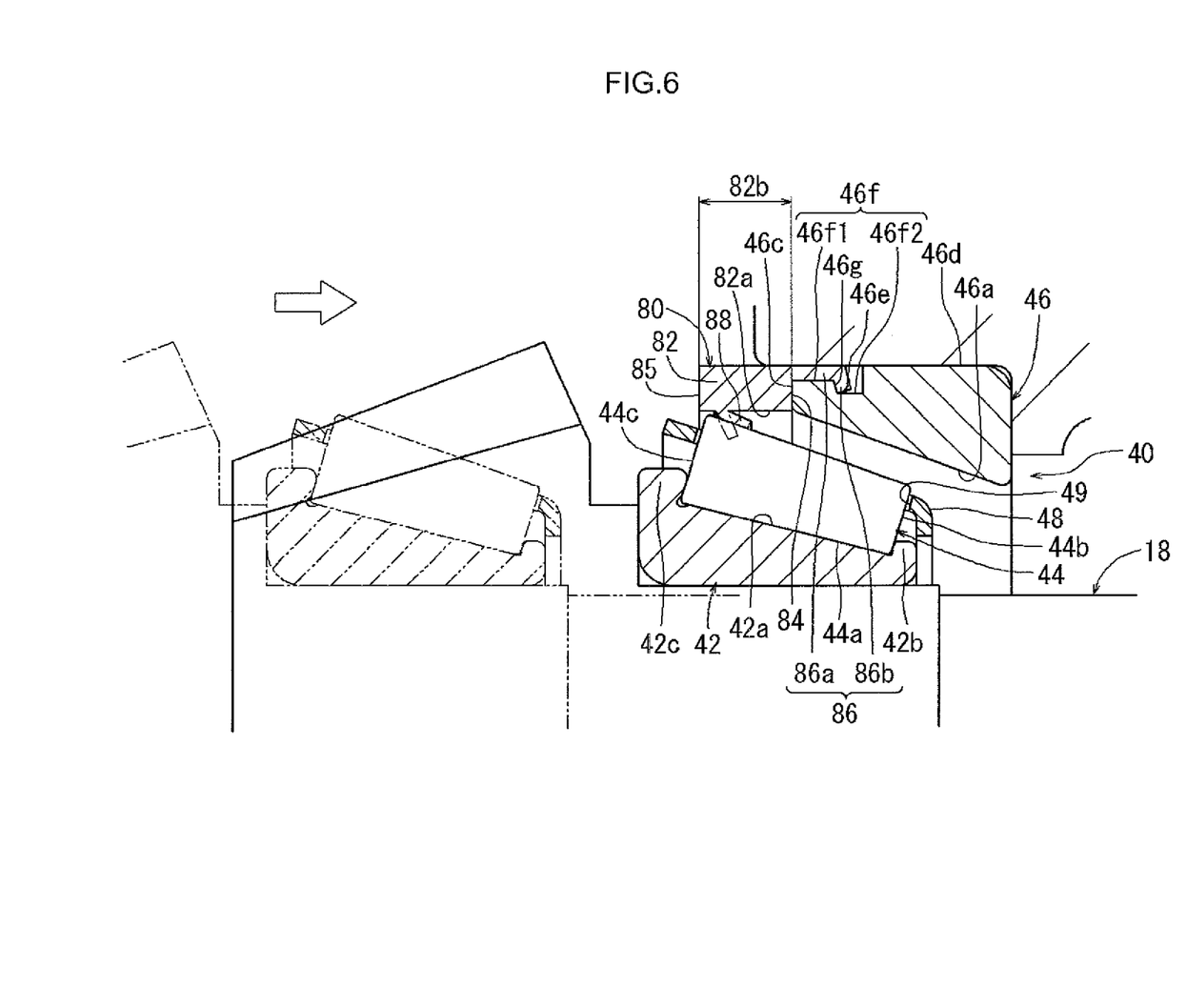
FIG. 6 is an enlarged sectional view illustrating the portion VI of FIG. 5 as enlarged.

The rear bearing 40 (tapered roller bearing) has substantially the same configuration as that of the front bearing 30. That is, as illustrated in FIGS. 1 and 6, the rear bearing 40 is composed of an inner ring 42, tapered rollers 44, an outer ring 46, a cage 48, and a lubricating oil holding member 80. The inner ring 42 is formed with an inner ring raceway surface 42a, a small rib 42b, and a large rib 42c. The outer ring 46 is formed with an outer ring raceway surface 46a. The tapered rollers 44 are each formed with a conical surface 44a, a roller small end face 44b, and a roller large end face 44c. The cage 48 holds the tapered rollers 44 such that the conical surfaces 44a of the tapered rollers 44 can rotate and revolve between the inner ring raceway surface 42a of the inner ring 42 and the outer ring raceway surface 46a of the outer ring 46. As with the outer ring 36, the outer ring 46 is also provided with engagement groove portions 46e in an outer peripheral surface 46d. As with the engagement groove portions 36e, the engagement groove portions 46e each have a notch portion 46f and a stepped surface 46g.

The lubricating oil holding member 80 is a member that provides a reservoir portion for lubricating oil L by holding the lubricating oil L distributed in the rear bearing 40. The lubricating oil holding member 80 is also a member that guides the lubricating oil L toward the outer peripheral surface of the large rib 42c of the inner ring 42. As illustrated in FIG. 6, the lubricating oil holding member 80 is disposed adjacent to the large diameter-side outer ring end surface 46c of the outer ring raceway surface 46a of the outer ring 46 (an outer ring end surface of the outer ring on the large diameter side of the outer ring raceway surface). In other words, the large diameter-side outer ring end surface 46c is an end surface of the outer ring 46 corresponding to a large rib 42c side of the inner ring 42. As with the lubricating oil holding member 60, the lubricating oil holding member 80 is made of a synthetic resin with good oil resistance and heat resistance. In the lubricating oil holding member 80, a cylindrical portion 82, an inner peripheral surface 82a, an axial length 82b, an abutment surface 84, a pressing surface 85, fitting hooks 86, and a projection 88 are provided integrally. The lubricating oil holding member 80 has substantially the same configuration as that of the lubricating oil holding member 60, and therefore is only illustrated and not described.

Figure 5:
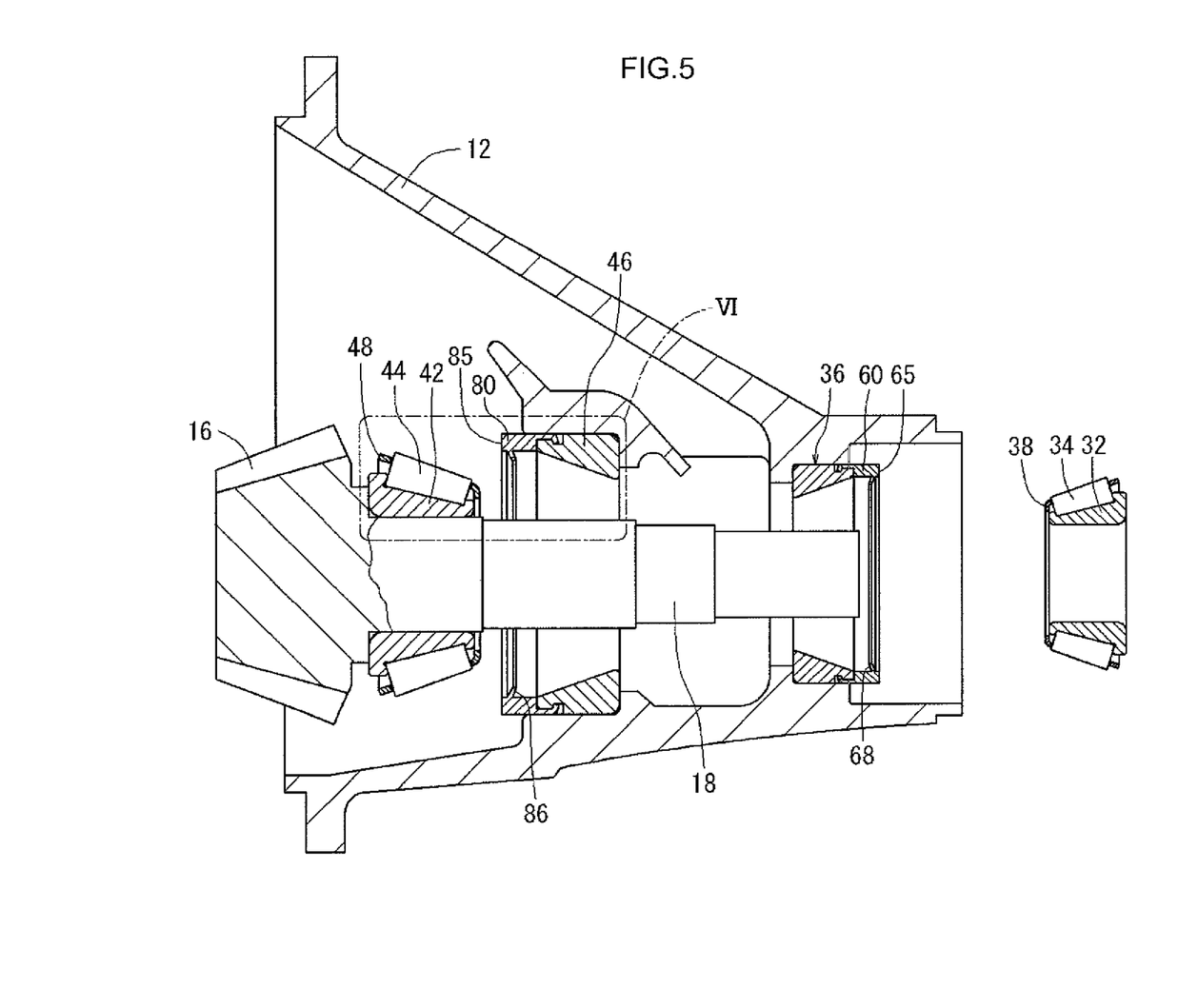
FIG. 5 is a sectional view schematically illustrating assembly of the tapered roller bearing according to the embodiment taken along the axial direction.

An assembly process for the front bearing 30 and the rear bearing 40 will be described using the differential device 10 as an example. As illustrated in FIGS. 5 and 6, the lubricating oil holding member 60 is concentrically placed adjacent to the outer ring 36 in the axial direction. In addition, the fitting hooks 66 (see FIG. 2) of the lubricating oil holding member 60 are fitted in the engagement groove portions 36e (see FIG. 2) of the outer ring 36. Similarly, the lubricating oil holding member 80 is concentrically placed adjacent to the outer ring 46 in the axial direction. In addition, the fitting hooks 86 of the lubricating oil holding member 80 are fitted in the engagement groove portions 46e of the outer ring 46. Next, the outer ring 36 and the lubricating oil holding member 60 placed adjacent to each other in the axial direction are press-fitted into the differential carrier 12 (housing) in advance by pressing the pressing surface 65. Similarly, the outer ring 46 and the lubricating oil holding member 80 placed adjacent to each other in the axial direction are press-fitted into the differential carrier 12 (housing) in advance by pressing the pressing surface 85. Subsequently, the cage 48 with the tapered rollers 44 housed in the pockets 49 is disposed on the inner ring raceway surface 42a of the inner ring 42 to obtain a three-in-one temporary assembly. The three-in-one temporary assembly of the inner ring 42, the cage 48, and the tapered rollers 44 is press-fitted with the drive pinion shaft 18 (shaft). In addition, the inner ring 42, the cage 48, and the tapered rollers 44 mounted to the drive pinion shaft 18 are fitted into the outer ring raceway surface 46a of the outer ring 46. In this event, although an end portion of the cage 48 and end portions of the tapered rollers 44 contact the projection 88, the projection 88 is elastically deformed, so that such end portions are fitted into the outer ring raceway surface 46a without being damaged. Next, the cage 38 with the tapered rollers 34 housed in the pockets 39 (see FIG. 2) is disposed on the inner ring raceway surface 32a (see FIG. 2) of the inner ring 32 to obtain a three-in-one temporary assembly. Subsequently, the three-in-one temporary assembly of the inner ring 32, the cage 38, and the tapered rollers 34 is press-fitted into the outer ring raceway surface 36a of the outer ring 36 from an axial end of the drive pinion shaft 18. In this event, although an end portion of the cage 38 and end portions of the tapered rollers 34 contact the projection 68, the projection 68 is elastically deformed, so that such end portions are fitted into the outer ring raceway surface 36a without being damaged.

As illustrated in FIG. 1, the front bearing 30 and the rear bearing 40 are disposed on the drive pinion shaft 18 with a space therebetween in the axial direction. The inner rings 32 and 42 are fitted with the drive pinion shaft 18. The rear bearing 40 is disposed adjacent to the drive pinion 16 as seen in FIG. 1. The front bearing 30 is disposed adjacent to the sleeve 22 of the companion flange 20 as seen in FIG. 1. That is, the front bearing 30 and the rear bearing 40 are disposed on the upstream side and the downstream side, respectively, in a drive path. In addition, the small rib 32b (see FIG. 2), which is on the small diameter end portion side of the inner ring 32, and the small rib 42b (see FIG. 6), which is on a small diameter end portion side of the inner ring 42, are disposed to face each other. In other words, the roller small end faces 34b (see FIG. 2) of the tapered rollers 34 and the roller small end faces 44b (FIG. 6) of the tapered rollers 44 are disposed to face each other.

A space in the differential carrier 12 between the front bearing 30 and the rear bearing 40, which are disposed with a space therebetween in the axial direction, is formed as an oil reservoir 50 from which the lubricating oil L is supplied to both the bearings 30 and 40. The lubricating oil L in the differential device 10 is mainly stored in a lubricating oil chamber 52 in which the differential ring gear 14 is disposed. The lubricating oil L in the lubricating oil chamber 52 is stirred when the differential ring gear 14 rotates about a drive shaft 13, and scattered in the lubricating oil chamber 52 (splashing action). The lubricating oil L stirred to be splashed upward passes through an introduction flow path 54 formed in the upper part of the differential carrier 12 to be introduced into the oil reservoir 50. The introduction flow path 54 is formed to communicate between the upper part of the lubricating oil chamber 52 and the upper part of the oil reservoir 50, and shaped such that the lubricating oil L introduced into the introduction flow path 54 can flow down because of its own weight. In the embodiment, the introduction flow path 54 is shaped to be inclined downward toward the oil reservoir 50. As illustrated in FIG. 1, the rotational direction of the differential ring gear 14 is the clockwise direction as seen in FIG. 1 during forward travel. Along with the rotation, the lubricating oil L is also scattered in the clockwise direction, and introduced from the upper opening of the introduction flow path 54 to flow down into the oil reservoir 50.

The lubricating oil L introduced into the oil reservoir 50 lubricates the front bearing 30 and the rear bearing 40 disposed on both sides thereof. The front bearing 30 is lubricated by the lubricating oil L distributed from a small rib 32b side, which is on the small diameter end portion side of the inner ring 32, toward the large rib 32c, which is on the large diameter end portion side of the inner ring 32. Likewise, the rear bearing 40 is lubricated by the lubricating oil L distributed from a small rib 42b side, which is on the small diameter end portion side of the inner ring 42, toward the large rib 42c, which is on a large diameter end portion side of the inner ring 42. In other words, the front bearing 30 is lubricated by the lubricating oil L distributed from roller small end face 34b sides of the tapered rollers 34 toward the roller large end faces 34c. Likewise, the rear bearing 40 is lubricated by the lubricating oil L distributed from a roller small end face 44b sides of the tapered rollers 44 toward the roller large end faces 44c.

Distribution of the lubricating oil L from the small rib 32b side and the small rib 42b side, which are on the small diameter end portion side of the inner ring 32 of the front bearing 30 and the small diameter end portion side of the inner ring 42 of the rear bearing 40, respectively, is caused by an oil drawing phenomenon called a pumping action of the tapered roller bearings. That is, the lubricating oil L that has flowed into the bearings is distributed in the bearings by a centrifugal force generated as the tapered rollers rotate and revolve and discharged toward the large ribs 32c and 42c. In this way, the lubricating oil L in the oil reservoir 50 is distributed from the small rib 32b side and the small rib 42b side, which are on the small diameter end portion side of the inner ring 32 of the front bearing 30 and the small diameter end portion side of the inner ring 42 of the rear bearing 40, toward the large rib 32c and 42c, which are on the respective large diameter end portion sides, to lubricate the front bearing 30 and the rear bearing 40.

The lubricating oil L that has lubricated the rear bearing 40 returns from the large rib 42c side, which is on the large diameter end portion side of the inner ring 42 (in other words, the roller large end face 44c sides of the tapered rollers 44), to the lubricating oil chamber 52. The lubricating oil L that has lubricated the front bearing 30 is discharged from the large rib 32c side, which is on the large diameter end portion side of the inner ring 32 (in other words, roller large end face 34c sides of the tapered rollers 34), to the oil return reservoir 56. The oil return reservoir 56 serves to lubricate an oil seal 58 with the lubricating oil L discharged from the front bearing 30. The oil seal 58 is disposed in front of the oil return reservoir 56 as seen in FIG. 1, and fitted with the sleeve 22 of the companion flange 20. The radially outer portion of the oil seal 58 is fixed and supported by the differential carrier 12. Thus, the radially inner portion of the oil seal 58 rotatably tightly contacts the sleeve 22 in a sealed state, and the seal portion needs to be lubricated. A return flow path (not illustrated) couples between the oil return reservoir 56 and the lubricating oil chamber 52 to return the lubricating oil L stored in the oil return reservoir 56 to the lubricating oil chamber 52. The return flow path is formed at the lowest position of the differential carrier 12 so as to successfully return the lubricating oil L stored in the oil return reservoir 56.

The viscosity of the lubricating oil L used in the differential device 10 is varied in accordance with the temperature of use. In general, lubricating oil is known to have a low viscosity at a high temperature of use, and have a high viscosity at a low temperature of use. In the front bearing 30 and the rear bearing 40, as the drive pinion shaft 18 is turned, the conical surfaces 34a of the tapered rollers 34 roll between the inner ring raceway surface 32a of the inner ring 32 and the outer ring raceway surface 36a of the outer ring 36, and the conical surfaces 44a of the tapered rollers 44 similarly roll between the inner ring raceway surface 42a of the inner ring 42 and the outer ring raceway surface 46a of the outer ring 46. Because such components are subjected to rolling contact, the temperature of the components is not easily raised by sliding friction.

On the other hand, sliding contact is performed between the roller large end faces 34c of the tapered rollers 34 and the large rib 32c, which is on the large diameter end portion side of the inner ring 32. Similarly, sliding contact is also performed between the roller large end faces 44c of the tapered rollers 44 and the large rib 42c, which is on the large diameter end portion side of the inner ring 42. The temperature in the front bearing 30 and the rear bearing 40 may be raised along with sliding friction due to such sliding contact. If the lubricating oil L flows in with the temperature in the front bearing 30 and the rear bearing 40 in a high-temperature state, the viscosity of the lubricating oil L is reduced. If the viscosity of the lubricating oil L is low, metallic contact may be caused during rolling with an oil film of the lubricating oil L not sufficiently formed between the tapered rollers 34 and the inner ring 32 and the outer ring 36 and between the tapered rollers 44 and the inner ring 42 and the outer ring 46 constituting the tapered roller bearings, which tends to cause abnormal wear or a seizure. In an initial period of rotation such as during startup of the differential device 10, in addition, the splashing action of the differential ring gear 14 may not be sufficient, the amount of lubricating oil introduced from the introduction flow path 54 is small, and the amount of lubricating oil remaining in the oil reservoir 50 is small, which may cause poor lubrication. In such a case as well, abnormal wear or a seizure tends to be caused.

In general, when the differential device 10 is brought into a high-temperature state along with long hours of continuous operation, it is attempted to suppress the internal pressure in the differential device by use of a breather device in order to suppress a reduction in lubrication efficiency with the lubricating oil L, and to cool the lubricating oil L using an oil cooler in order to make the temperature of use of the lubricating oil L splashed by the differential ring gear 14 to be introduced into the lubricating oil reservoir 50 suitable.

Even if the temperature of use of the lubricating oil L introduced into the lubricating oil reservoir 50 is suitable, however, the temperature of the lubricating oil L that has flowed into the front bearing 30 and the rear bearing 40 becomes high to reduce the viscosity of the lubricating oil L if the bearings are maintained in a high-temperature state because of heat due to sliding friction. Therefore, lubrication may not be performed well. Further, lubrication may be poorer if the lubricating oil L in the high-temperature state circulates in the differential device 10 and flows into the front bearing 30 and the rear bearing 40 again.

The lubricating oil holding member 60 is provided for the front bearing 30. The lubricating oil holding member 80 is provided for the rear bearing 40. The lubricating oil holding member 60 provided for the front bearing 30 will be described as an example. In the lubricating oil holding member 60, a part of the projection 68 located below the axial center can hold the lubricating oil L distributed in the front bearing 30 to provide a reservoir portion for the lubricating oil L. That is, the projecting length of the projection 68 is set such that the projection 68 overlaps a part of the roller large end faces 34c of the tapered rollers 34 in the radial direction with the front bearing 30 and the lubricating oil holding member 60 placed adjacent in the axial direction. Consequently, the part of the projection 68 located below the axial center can hold the lubricating oil L distributed in the front bearing 30 to provide a reservoir portion for the lubricating oil L. The reservoir portion for the lubricating oil L may contact a part of the roller large end faces 34c of the tapered rollers 34 to cool the tapered rollers 34. In the lubricating oil holding member 60, a part of the projection 68 located above the axial center can guide the lubricating oil L toward the outer peripheral surface of the large rib 32c of the inner ring 32. In this way, the front bearing 30 can suitably suppress a seizure of portions of the large end faces 34c of the tapered rollers 34 subjected to sliding contact. The rear bearing 40 also has such a configuration.

Accordingly, with the front bearing 30 (tapered roller bearing) according to the embodiment, the following effects can be obtained. In the lubricating oil holding member 60 configured as described above, the cylindrical portion 62 has the axial length 62b from the large diameter-side outer ring end surface 36c of the outer ring 36 to an end portion of the cage 38, and can resist a pressing force for press-fitting the outer ring 36. Therefore, the lubricating oil holding member 60 can be prevented from being crushed by the pressing force for press-fitting the outer ring 36. In addition, the lubricating oil holding member 60 has the abutment surface 64 that is in surface contact with the large diameter-side outer ring end surface 36c of the outer ring 36. Therefore, the lubricating oil holding member 60 adjacent to the outer ring 36 can be press-fitted into the differential carrier 12 (housing). In addition, the lubricating oil holding member 60 is configured to project in the axial direction from the abutment surface 64 to be fitted in the engagement groove portions 36e provided in the outer peripheral surface 36d of the outer ring 36. Therefore, the lubricating oil holding member 60 is not easily detached from the outer ring 36. Thus, it is not required to mount the lubricating oil holding member 60 after the front bearing 30 is mounted, which may improve the mounting workability. In addition, the lubricating oil holding member 60 has the fitting hooks 66 for attachment to the outer ring 36, which can reduce the number of components. In the lubricating oil holding member 60, in addition, one end of the cylindrical portion 62 has the abutment surface 64 that is in surface contact with the large diameter-side outer ring end surface 36c. Thus, it is not required to perform a process for forming an end portion of the outer ring 36 to be thin, for example, which may suppress a reduction in processability due to deformation or the like due to heat treatment.

In the lubricating oil holding member 60, in addition, the fitting hooks 66 are provided on the inner peripheral surfaces of the coupling portions 66a (protrusions) extending in the axial direction from the abutment surface 64. Therefore, the fitting hooks 66 may be suitably fitted in the engagement groove portions 36e provided in the outer ring 36.

In the lubricating oil holding member 60, in addition, a plurality of the fitting hooks 66 are provided at one end of the cylindrical portion 62, and disposed with a space therebetween in the circumferential direction. Therefore, the area of the abutment surface 64 can be increased. Therefore, deformation that occurs when the lubricating oil holding member 60 adjacent to the outer ring 36 is press-fitted into the differential carrier 12 can be suppressed.

The engagement groove portions 36e provided in the outer peripheral surface 36d of the outer ring 36 are disposed for the respective fitting hooks 66. Therefore, the number of portions of the outer ring 36 to be processed can be reduced. Accordingly, the cost of manufacture of the front bearing 30 may be suppressed. In the lubricating oil holding member 60, in addition, the projection 68 is provided integrally with the cylindrical portion 62, which can further reduce the number of components.

If the engagement groove portions 36e in the outer peripheral surface 36d of the outer ring 36 are formed as an annular surface, the cutting process may be complicated. In the configuration described above, however, the engagement groove portions 36e may each be formed by the notch portion 36f and the stepped surface 36g cut into a flat shape. Therefore, the cost of manufacture of the tapered roller bearing may be suppressed by adopting a simple cutting process. In addition, the lubricating oil holding member 60 is made of a synthetic resin with good oil resistance and heat resistance, and therefore can be configured to have a light weight.

In addition, a three-in-one temporary assembly of the inner ring 32, the cage 38, and the tapered rollers 34 may be fitted into the outer ring raceway surface 36a of the outer ring 36 with the outer ring 36 press-fitted into the differential carrier 12 in advance during assembly. In this event, it is considered that the projection 68 of the lubricating oil holding member 60 interferes with the cage 38 and the tapered rollers 34. However, the projection 68 of the lubricating oil holding member 60 is formed to be thin with respect to the thickness of the cylindrical portion 62 and is thus elastically deformable, in addition to being made of a synthetic resin. Accordingly, a hindrance to the fitting process is suppressed by elastic deformation of the projection 68 of the lubricating oil holding member 60 even in the case where the projection 68 interferes with the cage 38 and the tapered rollers 34. Therefore, the three-in-one temporary assembly can be smoothly fitted into the outer ring raceway surface 36a of the outer ring 36. Since the projection 68 of the lubricating oil holding member 60 is made of a synthetic resin, damage to the cage 38 and the tapered rollers 34 may be suppressed. In the lubricating oil holding member 60, in addition, the projection 68 is provided to extend aslope toward the abutment surface 64. Therefore, the projection 68 is easily elastically deformed in the fitting process.

The rear bearing 40 (tapered roller bearing) according to the embodiment has substantially the same configuration, and can achieve the same effects as those achieved by the front bearing 30.

Although an embodiment of the present invention has been described above, the present invention is not limited to the embodiment, and may be implemented in a variety of other embodiments. For example, although the lubricating oil holding members are made of a synthetic resin, the present invention is not limited thereto. For example, the lubricating oil holding members may be made of metal.

In the embodiment described above, in addition, the present invention is applied to a rear differential device, among the differential devices applied to an automobile with four-wheel drive. However, the present invention may also be applied to a front differential device. In addition, the present invention may also be applied to a variety of other drive systems such as front-engine front-drive and front-engine rear-drive systems. For example, the present invention may also be applied to a tapered roller bearing that supports a shaft mounted inside a gear mechanism such as a transmission.

According to the present invention, it is possible to provide a tapered roller bearing having such a lubricating oil holding configuration in an outer ring end surface of an outer ring on the large diameter side of an outer ring raceway surface that allows reducing the number of components, improving the mounting workability, and suppressing a reduction in processability of the outer ring.

What is claimed is:

1. A tapered roller bearing comprising:
    an inner ring that has an outer peripheral surface formed as an inner ring raceway surface in a shape of a conical surface;
    an outer ring that is disposed concentrically on an outer circumferential side of the inner ring and has an inner peripheral surface formed as an outer ring raceway surface in a shape of a conical surface;
    a plurality of tapered rollers rollably disposed in an annular space between the inner ring raceway surface and the outer ring raceway surface;
    a cage that has a plurality of pockets in which the plurality of tapered rollers are held; and
    a lubricating oil holding member that is disposed adjacent to an outer ring end surface of the outer ring on a large diameter side of the outer ring raceway surface and holds a lubricating oil held in the tapered roller bearing, wherein
    the lubricating oil holding member includes:
        a cylindrical portion having an axial length from the outer ring end surface of the outer ring on the large diameter side to an end of the cage, the cylindrical portion having a thickness that is the same as a thickness of the outer ring end surface on the large diameter side;
        a fitting hook that is connected to one end of the cylindrical portion, that projects in an axial direction from an abutment surface which is in surface contact with the outer ring end surface of the outer ring on the large diameter side, and that is fitted in an engagement groove portion provided in an outer peripheral surface of the outer ring;
        the engagement groove portion has a stepped surface formed by a notch portion, the notch portion being formed by cutting the outer peripheral surface of the outer ring into a flat shape to form a planar outer peripheral surface of the notch portion such that the fitting hook is engaged with the stepped surface; and
        a projection that projects radially inward from an inner peripheral surface of the cylindrical portion.

2. The tapered roller bearing according to claim 1, wherein
    the fitting hook is provided on an inner peripheral surface of a protrusion that extends in the axial direction from the abutment surface.

3. The tapered roller bearing according to claim 2, wherein a plurality of the fitting hooks are provided at the one end of the cylindrical portion, and disposed with a space therebetween in a circumferential direction.

4. The tapered roller bearing according to claim 2, wherein
the projection is provided integrally with the cylindrical portion.

5. The tapered roller bearing according to claim 2, wherein
the lubricating oil holding member is made of a synthetic resin.

6. The tapered roller bearing according to claim 5, wherein
the projection of the lubricating oil holding member is formed to be thin with respect to a thickness of the cylindrical portion so as to be elastically deformable.

7. The tapered roller bearing according to claim 6, wherein
the projection is provided to extend aslope toward the abutment surface.

8. The tapered roller bearing according to claim 1, wherein
a plurality of the fitting hooks are provided at the one end of the cylindrical portion, and disposed with a space therebetween in a circumferential direction.

9. The tapered roller bearing according to claim 8, wherein
a plurality of the engagement groove portions provided in the outer peripheral surface of the outer ring are disposed for the respective fitting hooks.

10. The tapered roller bearing according to claim 8, wherein
the projection is provided integrally with the cylindrical portion.

11. The tapered roller bearing according to claim 1, wherein
a plurality of the engagement groove portions provided in the outer peripheral surface of the outer ring are disposed for a respective plurality of the fitting hooks.

12. The tapered roller bearing according to claim 1, wherein
the projection is provided integrally with the cylindrical portion.

13. The tapered roller bearing according to claim 1, wherein
the lubricating oil holding member is made of a synthetic resin.

14. The tapered roller bearing according to claim 13, wherein
the projection of the lubricating oil holding member is formed to be thin with respect to a thickness of the cylindrical portion so as to be elastically deformable.

15. The tapered roller bearing according to claim 14, wherein
the projection is provided to extend aslope toward the abutment surface.

16. The tapered roller bearing according to claim 1, wherein
the projection is provided to extend aslope toward the abutment surface, the projection having a tip position set such that the projection overlaps a part of a large radially-extending rib of the inner ring in the axial direction.

17. The tapered roller bearing according to claim 1, wherein
the projection extends radially inward from the inner peripheral surface of the cylindrical portion at a location that is spaced axially inward from a second end of the cylindrical portion that is opposite to the abutment surface.

18. The tapered roller bearing according to claim 1, wherein
the notch portion has two notch surfaces with different depths relative to the outer peripheral surface of the outer ring so as to form a stepped surface,
a first one of the two notch surfaces is adjacent to the outer ring end surface, and
a second one of the two notch surfaces is adjacent to the first notch surface in the axial direction and is deeper than the first notch surface.

19. The tapered roller bearing according to claim 18, wherein
each of the two notch surfaces comprises a planar outer peripheral surface.

20. The tapered roller bearing according to claim 1, wherein
the planar outer peripheral surface of the notch portion extends perpendicular to the axial direction.

* * * * *